United States Patent
Tsao

(10) Patent No.: US 8,022,895 B2
(45) Date of Patent: Sep. 20, 2011

(54) ACTIVE SCREEN VOLUMETRIC 3D DISPLAY

(76) Inventor: Che-Chih Tsao, Arlington, MA (US)

(*) Notice: Subject to any disclaimer, the term of this patent is extended or adjusted under 35 U.S.C. 154(b) by 1558 days.

(21) Appl. No.: 11/188,408

(22) Filed: Jul. 25, 2005

(65) Prior Publication Data

US 2006/0017653 A1 Jan. 26, 2006

Related U.S. Application Data

(60) Provisional application No. 60/591,128, filed on Jul. 26, 2004.

(51) Int. Cl.
*G09G 5/00* (2006.01)

(52) U.S. Cl. .............................. 345/6; 345/55

(58) Field of Classification Search ........... 348/E13.002, 348/E13.022, E13.067; 345/6, 31, 653, 664, 345/679; 359/458; 715/757, FOR. 205
See application file for complete search history.

(56) References Cited

U.S. PATENT DOCUMENTS

| | | | | |
|---|---|---|---|---|
| 4,160,973 A | * | 7/1979 | Berlin, Jr. .......................... | 345/31 |
| 5,082,350 A | * | 1/1992 | Garcia et al. .................. | 359/478 |
| 6,154,301 A | * | 11/2000 | Harvey .......................... | 398/213 |
| 6,204,832 B1 | * | 3/2001 | Melville et al. ................. | 345/55 |
| 6,487,020 B1 | | 11/2002 | Favalora ........................ | 359/619 |
| 2002/0063661 A1 | * | 5/2002 | Comiskey et al. .............. | 345/55 |
| 2003/0193142 A1 | * | 10/2003 | Champion et al. ............ | 273/292 |

* cited by examiner

*Primary Examiner* — Nitin Patel

(57) ABSTRACT

The volumetric 3D display system of this invention applies a moving display panel that sweeps a display space. The full volume swept by the active screen is used as display space. A 3D image to be displayed is first processed into slices of image data based on an orthogonal 3D grid structure. The slice data are then converted into image frames to be displayed on the active screen by mapping the location indices in the orthogonal 3D grid to the location indices on the moving screen. The preferred method of displaying an image frame is to convert each image frame into a number of "image shots" and then display those image shots in sequence. An image shot comprises a number of simple orthogonal patterns aligned in vertical or horizontal directions. Combination of a number of image shots approximates the corresponding image frame.

9 Claims, 11 Drawing Sheets

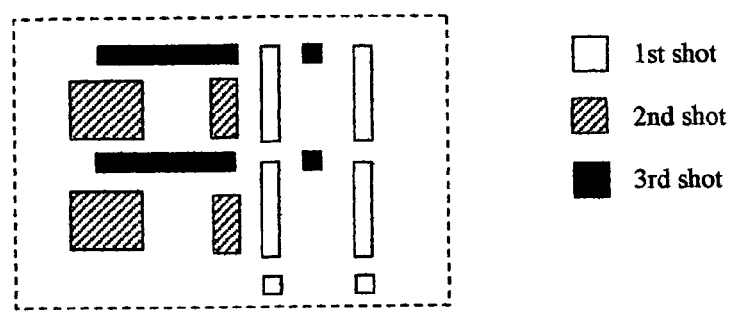
Fig. 11
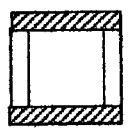
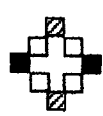
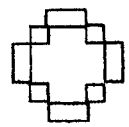
Fig. 12a
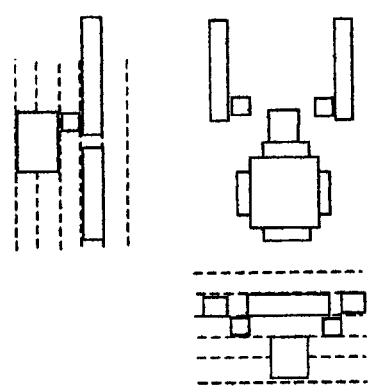
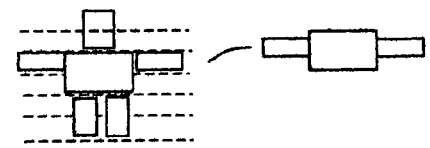
Fig. 12b
Fig. 12c
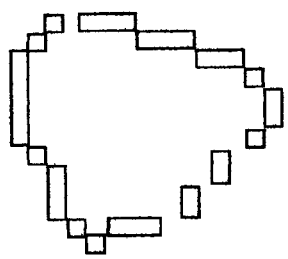
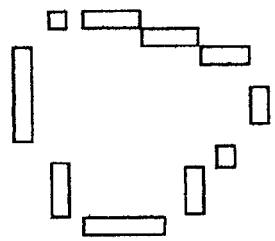
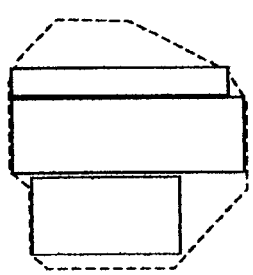
Fig. 13a
Fig. 13b
Fig. 13c

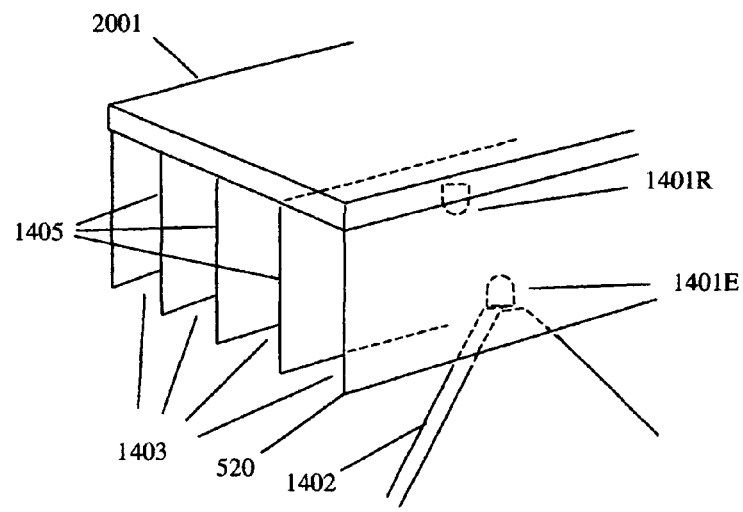
Fig. 14a
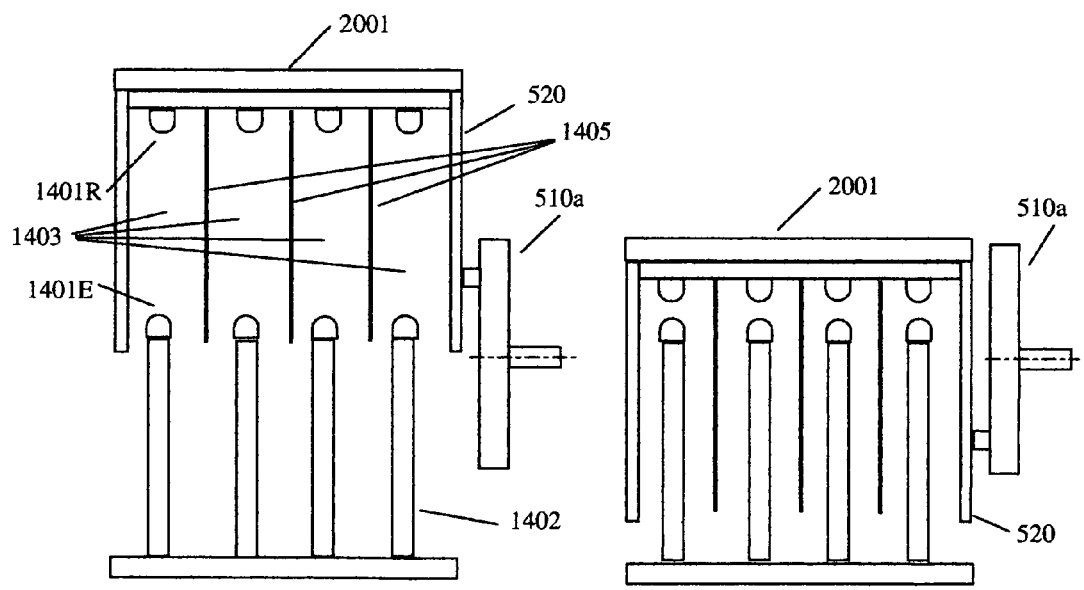
Fig. 14b                    Fug. 14c

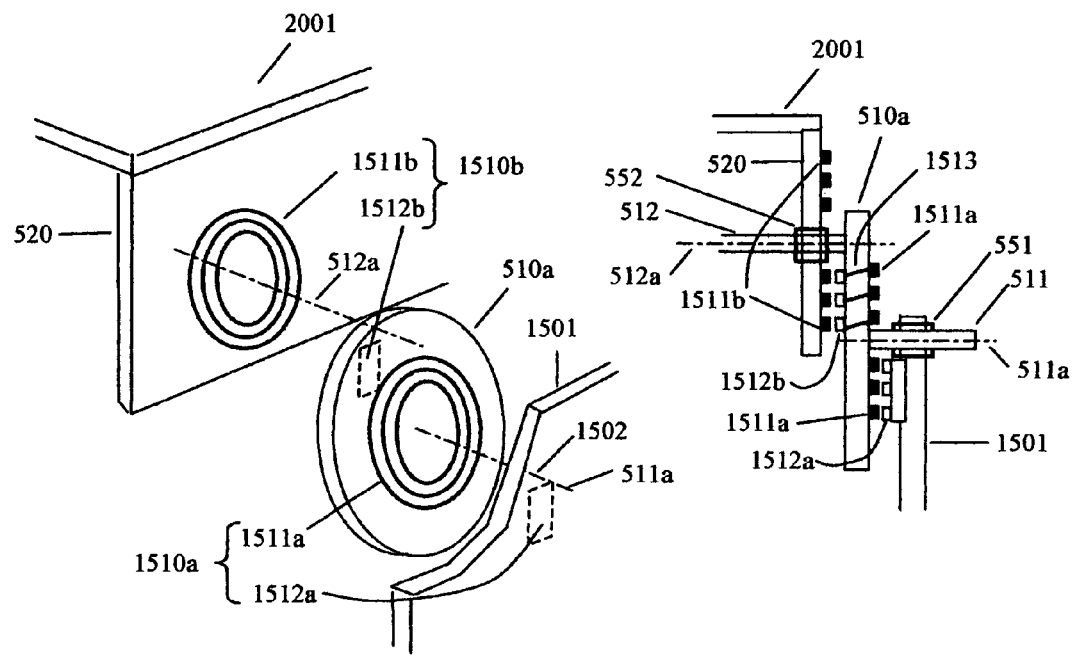
Fig. 15a
Fig 15b
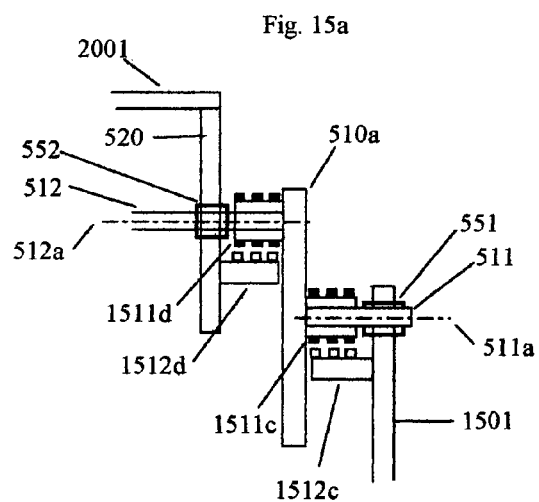
Fig. 16
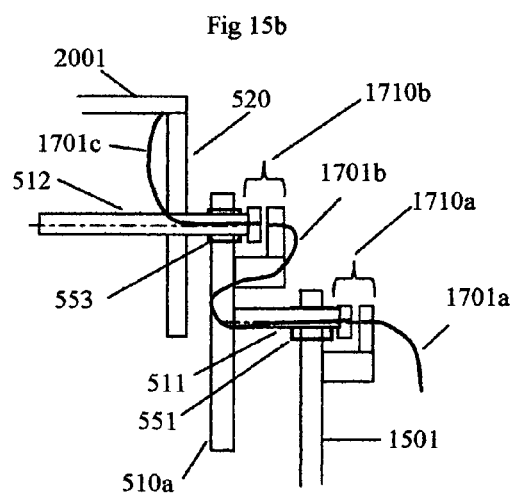
Fig 17

ACTIVE SCREEN VOLUMETRIC 3D DISPLAY

CROSS-REFERENCE TO RELATED APPLICATIONS AND OTHER DOCUMENTS

This application claims the benefit of prior U.S. provisional application No. 60/591,128, filed Jul. 26, 2004, the contents of which are incorporated herein by reference.

This invention relates to Tsao Japanese patent application No. 2001-318189, filed Oct. 16, 2001, laid open on Sep. 18, 2002 under No. P2002-268136A This invention relates to Tsao U.S. patent application Ser. No. 09/882,826, filed Jun. 16, 2001, which has been allowed. This invention also relates to the following co-pending U.S. provisional application by Tsao: No. 60/581,422, filed Jun. 21, 2004, No. 60/589,108 filed Jul. 19, 2004, and No. 60/589,626 filed Jul. 21, 2004.

This invention also relates to the following U.S. patents: Tsao et al., U.S. Pat. No. 5,754,147, 1998; Tsao, U.S. Pat. No. 5,954,414, 1999; Tsao, U.S. Pat. No. 6,302,542 B1, 2001; and Tsao, U.S. Pat. No. 6,765,566 B1, 2004.

This invention further relates to the following US Disclosure Documents:

1. Tsao, US PTO Disclosure Documentation #555751 (2004): "Image Data Memory Buffer System for Volumetric 3D Displays"

The above mentioned patents, pending applications and disclosure documents are therefore incorporated herein for this invention by reference.

STATEMENT REGARDING FEDERALLY SPONSORED R&D

Not Applicable

REFERENCE TO COMPACT DISK APPENDIX

Not Applicable

BACKGROUND OF THE INVENTION

This invention relates generally to volumetric 3D (V3D) displays, particularly for V3D displays applying a moving active display panel as the display means.

In the prior arts, there are a few descriptions of V3D displays based on a moving active display panel. Berlin in U.S. Pat. No. 4,160,973 describes a system with a rotating panel of light emitting diodes. Favalora in U.S. Pat. No. 6,487,020 describes a system with a rotating panel with emissive pixels with an overlay of micro-lenticular lens.

Tsao in Japanese patent application publication No. P2002-268136A describes a volumetric 3D (V3D) display that a "rotary reciprocating" mechanism drives a flat panel display to create volumetric 3D images directly, as illustrated in FIG. 1. The preferred flat panel display 2001 can be a board carrying arrays of LEDs (light emitting diodes) or OLEDs (organic light emitting diodes). The flat panel display is mounted on a support structure 520. Two pairs of rotary arms, 510a and 510c, drive the flat panel display and the support structure in a rotary motion such that the flat panel display rotates about an axis but with its surface always facing a fixed direction. As a result, the display panel sweeps a display space 12 as if in a reciprocating motion. The whole length of the flat display panel is larger than the length of the display space. As the flat panel display revolves to different positions, each corresponding 2D image frames of the volumetric 3D image to be displayed is kept within the display space by displaying each 2D image frames at a different location on the flat panel display, with the offset matching the location of the display space, as illustrated in FIG. 1. Image signals can be sent to the flat panel display through a cable 2002 connecting the display to its controller 2003. The cable can be made with minimum stiffness so that its effect on the display motion is also minimized. Alternatively, a wireless communication can replace the physical cable.

The V3D display described above can be categorized as a type of "Active Screen" V3D display, because the display screen requires active signal driving in order to display images.

This invention further develops the active screen V3D display technologies and describes improvements in a few key aspects.

This invention describes a method for processing frame image for displaying on the "rotary reciprocating" active screen.

This invention describes schemes of driving an active panel for the purpose of displaying V3D images.

This invention describes methods for designing 3D images that take advantage of the panel driving schemes.

This invention also describes methods and systems for coupling signals between the moving active screen and the stationary control.

This invention also describes the preferred image data memory buffer system.

BRIEF SUMMARY OF THE INVENTION

The volumetric 3D display system of this invention applies an active screen (i.e. a display panel) that moves in the "rotary reciprocating mode". The full volume swept by the active screen is used as display space. A 3D image to be displayed is first processed into slices of image data based on an orthogonal 3D grid structure. The slice data are then converted into image frames to be displayed on the active screen by mapping the location indices in the orthogonal 3D grid to the location indices on the moving screen. The image frames are then displayed in sequence on the moving active screen.

The preferred method of displaying an image frame is to convert each image frame into a number of "image shots" and then display those image shots in sequence. An image shot comprises a number of simple orthogonal patterns aligned in vertical or horizontal directions. Combination of a number of image shots approximates the corresponding image frame.

An image shot corresponds to a set of column signal vectors and a set of row signal vectors. A signal vector comprises a number of signal bits for driving a corresponding group of adjacent electrode lines on the display panel. In order to reduce the time of writing data to a frame, all driving signal bits are cleared at the beginning of writing a frame and only non-blank vectors are written to the display panel. This is called "Vector Writing". When displaying one image shot, driving signals are sent to column electrode lines and row electrode lines at full width, i.e. all lines driven simultaneously. This is called "full-width driving". The combined writing and driving procedure is called "Vector Driving".

The geometric nature of image shot allows the execution of Vector Driving. The method of displaying an image frame by several image shots contrasts traditional "row by row scanning" for displaying 2D images. The purpose is to reduce writing time and driving time required for displaying a frame to satisfy the high frame rate required on a volumetric 3D display.

The preferred systems for signal coupling between the moving display panel and a stationary controller includes (i)

BRIEF DESCRIPTION OF THE DRAWINGS

FIG. 11 illustrates the formation of a frame by a number of "shots" by this invention;

FIG. 12a-c illustrates examples of formations of simple V3D images by small number of frame and shots;

FIG. 13a-c illustrates examples of simplification of curves and areas for displaying with small number of shots;

FIG. 14a-c illustrates the first preferred embodiment of signal coupling system;

FIG. 15a-b and FIG. 16 illustrate the second preferred embodiment of signal coupling system;

FIG. 17 illustrates the third preferred embodiment of signal coupling system;

DETAILED DESCRIPTION OF THIS INVENTION

We'll use OLED as the preferred example of active screen to describe this invention. It will be shown later that the principles of this invention can be applied to general active screens.

1. Frame Image Processing and Display Method

Figure 1:
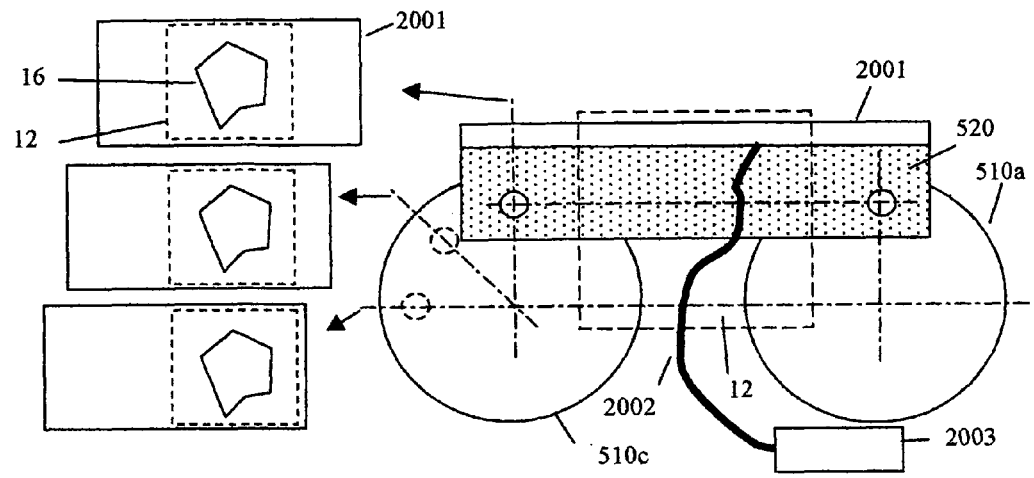
FIG. 1 illustrates a volumetric 3D display based on rotary reciprocating active screen in prior arts.
Figure 5:
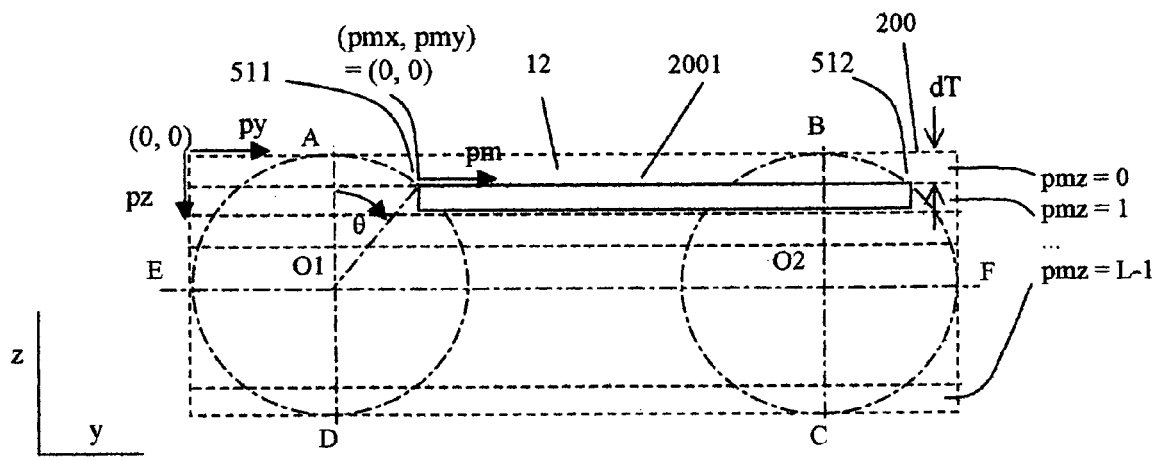
FIG. 5 illustrates a display screen rotating in "rotary reciprocating motion", in side view, showing the swept volume versus the Orthogonal Grid Element space.

Tsao in Japanese patent application publication no. P2002-268136A describes the system depicted in FIG. 1 as having a display space 12 smaller than the whole length of the flat display panel. This limitation is indeed not necessary. FIG. 5 illustrates a display screen 2001 with its two ends, 511 and 512, rotating about axis O1 and O2 respectively, i.e. in "rotary reciprocating motion", in side view. Since the active screen itself displays images, the whole space it sweeps can be used as the display volume. Therefore, the display volume 12 can cover a rectangular box, A-B-C-D, plus two half-cylinders, A-E-D and B-F-C.

The volumetric 3D display space is therefore composed of a 3D array of light elements. These light elements are formed by sweeping the active display plane through space. These light elements are created from the "pixels" of the moving 2D display plane. These light elements are called Grid Elements here in order to distinguish them from the term "voxels". "Voxel" is a term most usually used in traditional computer graphics to describe a fundamental 3D graphic element that will be rendered into "3D graphics" (i.e. perspective 3D view on a 2D display). A voxel data in that sense is not usually equivalent to the meaning of a Grid Element, because of different resolution, gray (color) scale and transparency etc.

Figure 2:
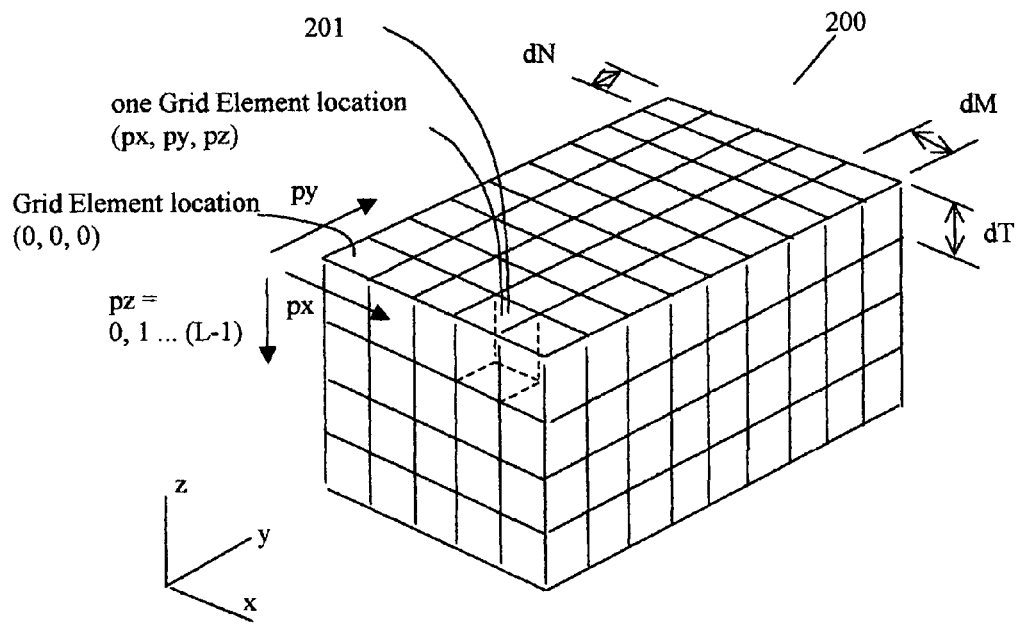
FIG. 2 illustrates an Orthogonal Grid Element structure for computing slice data of a V3D image.

As shown in FIG. 2, a Grid Element 201 is therefore a 3D spot having length, width and height. The length and width corresponds to the size of a pixel of the projected image frame. The height is measured in the direction of screen sweep and is the "thickness" of one "frame" or "slice" of the volumetric 3D image. The collection of Grid Elements in 3D space is therefore like a 3D grid 200. The length, width and height of each Grid Element are dM, dN and dT respectively. For ease of description and without loosing general validity, the illustration assumes the Grid Elements are aligned in orthogonal fashion when viewed by observers. This definition of "Orthogonal Grid Element system" is convenient for software programming and image processing because it is well structured.

However, because the motion of the active screen 2001 is "rotary reciprocating", the pixel locations are "rotary reciprocating" too. Therefore, a mapping between the pixel locations and the orthogonal Grid Elements is needed in order to convert the "slice image" obtained based on the Orthogonal Grid Element Structure into "frame image" on the moving active screen.

Figure 6:
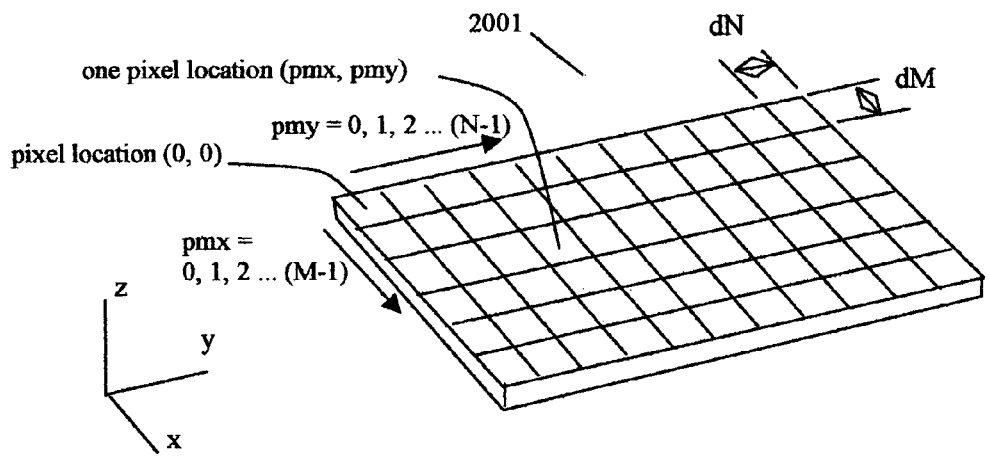
FIG. 6 illustrates the pixel structure of an active screen.

FIG. 6 illustrates the pixel structure of the active screen. The panel has M×N pixels. The pixel pitches dM and dN are the same as the Orthogonal Grid Element system. Each pixel is indexed along the x and y directions, as (pmx, pmy), for its location on the panel. The Orthogonal Grid Element (OGE) structure 200 is defined to just cover the display volume 11, as shown in FIG. 5. The OGE structure is also indexed, as (px, py, pz), for locating each Grid Element. The vertical direction is divided into L frames, matching the L slices in the Orthogonal Grid Element system.

The radius of rotation R of the active screen can therefore be expressed in terms of number of slices:

$$R = O1A = dT \times L/2.$$

The active screen does not move in the x-direction relative to the OGE structure, so $$pmx = px.$$

The active screen moves in the y-direction relative to the OGE structure, so $$pmy \times dN = py \times dN - R - R\sin\theta = py \times dN - dT \times L(1+\sin\theta)/2,$$

or $$pmy = py - R(1+\sin\theta)/dN = py - (dT/dN)L(1+\sin\theta)/2 \qquad (105)$$

wherein θ is from 0 to 360 degree and measured from screen at top position. From eqn. (105), $$pmy = py - R/dN - (R/dN)\sin\theta \qquad (106),$$

we see that the second term R/dN comes from the difference between the definitions of pmy's origin and of py's origin. The third term, (R/dN) sin θ, accounts for the actual correction due to the rotary reciprocating motion.

The z index is also the same, $$pmz = pz$$

$$pz \times dT = R - R\cos\theta$$

$$\theta = \cos^{-1}(1 - pz \times dT/R) = \cos^{-1}(1 - 2pz/L)$$

In summary, the mapping from Orthogonal Grid Element position indices (px, py, pz) to active frame pixel position indices (pmx, pmy, pmz) is:

$$\left.\begin{array}{l} pmx = px \\ pmz = pz \\ \theta = \cos^{-1}(1 - 2pz/L) \\ pmy = py - (dT/dN)L(1 + \sin\theta)/2 \end{array}\right\} \quad (108)$$

For "down sweeps", i.e. θ from 0 to 180 degree, the frame sequence to display is pmz=0, 1, 2 ... (L−1). For "up sweeps", i.e. θ from 180 to 360 degree, the frame sequence to display is pmz=(L−1), (L−2) ... 0. This is location indices to location indices mapping. Processing of data in terms of original xyz coordinates happens before this mapping and results in image data in the form of (px, py, pz) indices. (px, py) can be called orthogonal "slice data" for "slice image" and (pmx, pmy) can be called "frame data" for "frame image".

2. Panel Driving Schemes

Typical panel driving scheme for 2D displays is "raster scan", which in general scans each row and write data to each pixel on that row from the columns. For the purpose of Active Screen V3D displays, raster scan may have difficulty in meeting the required frame rate for V3D display. One limiting factor of the OLED, for example, is the response time of the organic light emitting cell, which is around 5-10 us. If the OLED is a passive panel (i.e. passive matrix), then each line must have an additional "stay-on" time to ensure the image is bright enough. If the OLED is an active matrix (AND panel, then the stay-on time is not needed However, the active matrix driving speed will not be comparable to those of other high frame rate devices such as DMD (digital micromirror device) or FLCD (ferroelectric liquid crystal display). This is because the AM OLED panels suitable for this invention are likely to be using poly-Si TFT or a-Si TFT, which is slower than the SRAM-based driving circuitry used on DMDs or FLCDs, which is made from monocrystalline silicon. The thin-film structure may also involve larger RC time constant per line. Further observation on the nature of V3D images shows that they are consisted of mostly points and curves (lines) and most of the area in a frame is blank (black), as being pointed out in Tsao U.S. Pat. No. 6,765,566. This is distinctly different from the cases of 2D displays, which usually fill every pixel with non-blank content. As a result, raster scanning can waste a lot of precious time in writing those blank pixels. Therefore, raster scanning is not preferred for Active Screen V3D displays.

The solution to this issue is to reduce addressing time by reducing the number of scans made per frame. Each scan should write as many active (non-blank) pixels, and as few blank pixels, as possible. In addition, the input and storage of row and column signals should be based on "vector write" instead of raster scan to reduce writing time.

Figure 7:
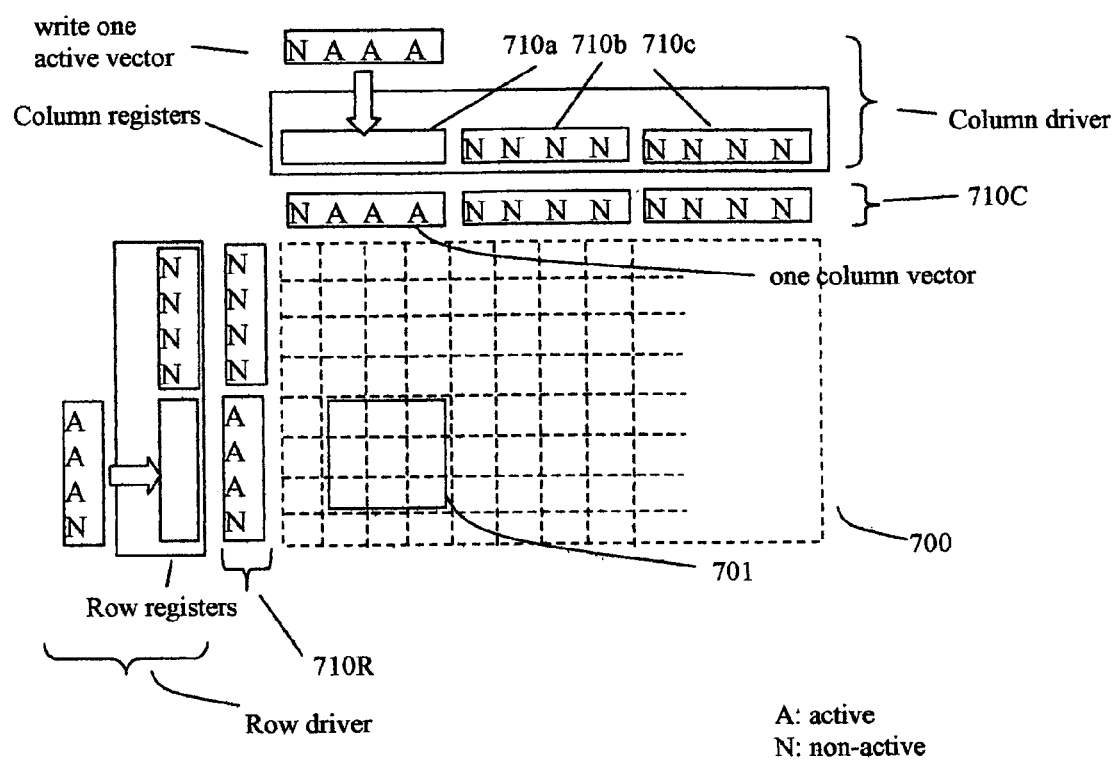
FIG. 7 illustrates the basic concept of Vector Driving scheme of this invention.

Referring to FIG. 7, the preferred row driver and column driver have the following features:

Full-width column registers are used on the column driver to store column signals. Column signals can be written to the column registers by vectors (i.e. random access). The columns are divided into a number of column groups, 710a-c, each column group containing a number of adjacent columns. Each column group matches to a storage group consisting of corresponding register bits. A group of signals (bits) can be written into any storage group via a data bus according to the selection by an address. Such a group of signals is called a "vector". Before each new write, the register is cleared to fill all storage groups with non-active vectors (i.e. with all bits blank or "0"). When writing signals to registers, only vectors that contain active signals (i.e. "1" bits) need to be written. During writing to registers, the register outputs are disabled so that the written signal will not go into the electrodes of the pixel matrix.

The row driver has a structure similar to the column driver, with full-width registers. Row signals can also be written to the row registers by vectors (i.e. random access), instead of by raster scan.

The driving scheme, instead of displaying the 2D pixel matrix row by row, is to display by a number of successive "shots". Each "shot" is to apply one whole set of stored row signals to the row electrodes and column signals to the column electrodes by enabling the register outputs, 710R and 710C, both in full-width, simultaneously.

In short, this is "vector writing plus full-width driving". This can be called "Vector Driving". The square block image 701 requires three row scans if using typical driving scheme for 2D display. Using Vector Driving, it requires only one "shot", as illustrated 2.1 Passive Matrix Display Panel as Active Screen

EXAMPLE 1

Driving Signals are Binary

Figure 8:
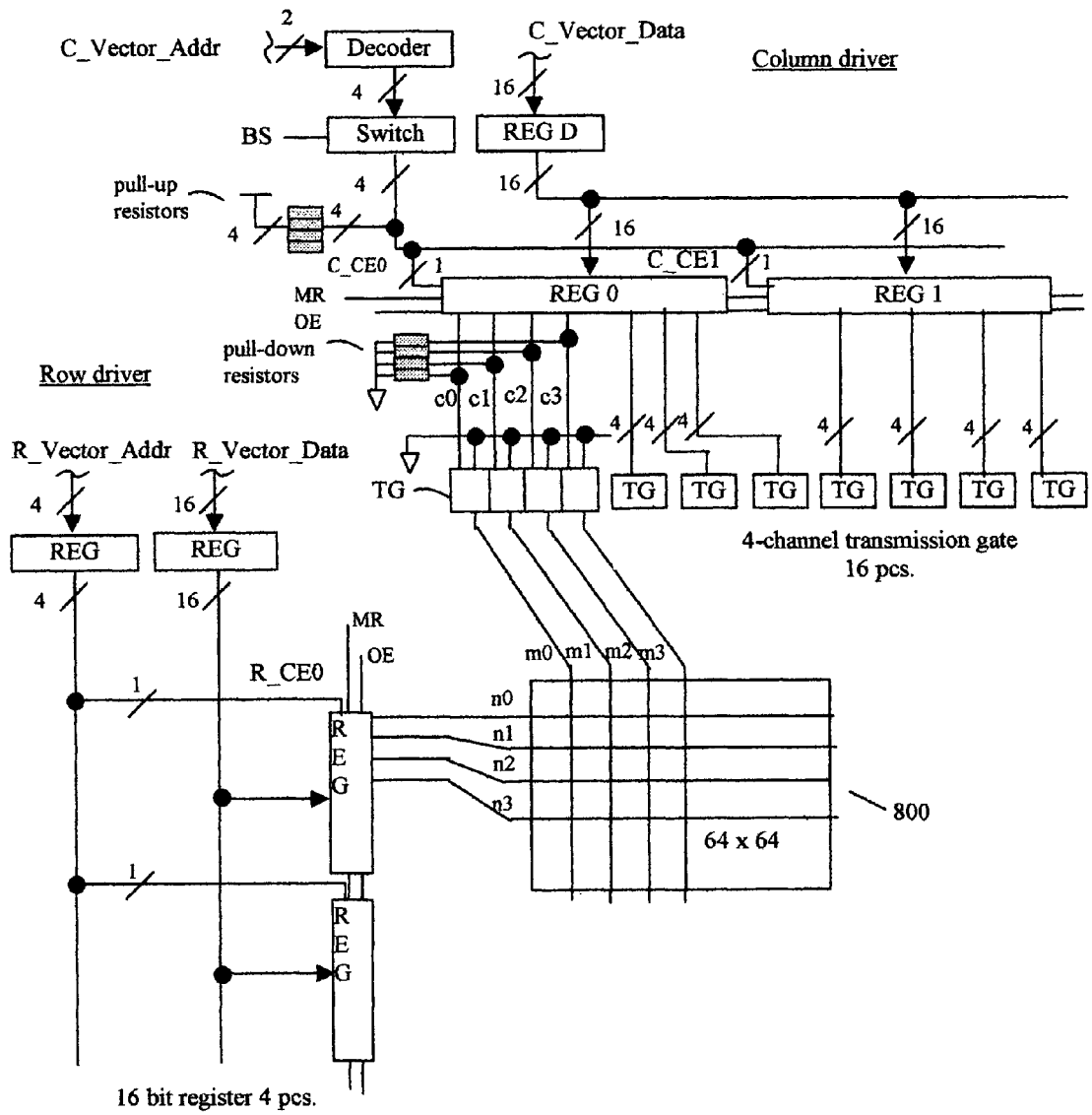
FIG. 8 uses a 64×64 passive OLED panel as an example to illustrate the Vector Driving circuitry with binary driving signals.

FIG. 8 uses a 64×64 passive OLED panel 800 as an example to illustrate the Vector Driving circuitry with binary driving signals. The circuitry is described using commonly seen devices, but take note that devices can be integrated into ICs or into thin film circuitry. Circuitry can also be formed by variations of components as long as the functions are similar. FIG. 8 assumes:

(1) Rows electrodes, e.g. n0-n3, are anode and columns, e.g. m0-m3, are cathodes.

(2) Driving signals across anodes and cathodes are binary (digital) signals.

(3) Row driver outputs are voltage outputs, for the convenience of explanation as an example. They can also be current sources and the row vectors can be the control voltages of the current sources.

A few keys points:

(1) Driving "shots" should be distributed evenly during a frame period.

(2) Overlapping of pixels in different shots is O.K. No erasing panel is needed, since the panel is passive.

(3) The truth table for driving signals:

| Column (cathode) | Row (anode) | Pixel state |
|---|---|---|
| Z (open) | x (don't care) | 0 |
| 0 | 0 | 0 |
| 0 | 1 | 1 |

(Referring to FIG. 7, for a PM OLED, to display an "off" pixel, either the column or the row has to be "Z", or else other off pixels could be turned on, under the full-width addressing scheme. Here, columns are set to Z or 0, and rows 0 or 1.)

Circuitry operations in one "shot":

Vector writing column registers: Column driver has 4 16-bits registers, REG 0-3 (only REG 0 and REG 1 are shown). Before writing starts, a master reset MR clears all register bits to 0. C_Vector_Addr selects the address of the target column register (storage group), to write to. Vector data C_Vector_Data is written to the target register. The registers are 3-state. Clock enables, C_CE0-C_CE3, select register. OE (output enable) is set to LO and puts register outputs in open state (Z) during vector writing. Transmission gates (TGs) control signals (c0, c1 . . .) control the status of TGs. Because register outputs are all Zs, TG controls are all pulled down and TGs are all disconnected. Column electrodes are therefore all open.

BS LO disconnects bus switch SWITCH and therefore pulls up all clock enables of column registers to select all registers, if needed.

Vector writing row registers: Row driver basically has the same configuration as the column driver, except that there is no TGs. (Pull-up, pull-down resistors and bus switch are omitted in the figure for simplicity.) The writing procedure is also the same.

Enabling a "shot": OE for both column registers and row registers is set to HI. On the columns, register output bit 0 sets TG output to "Z", bit 1 sets TG output to "0". On the rows, the register output bits are either "0" or "1".

EXAMPLE 2

Panel Driving Signals are Analog

Figures 9A, 9B:
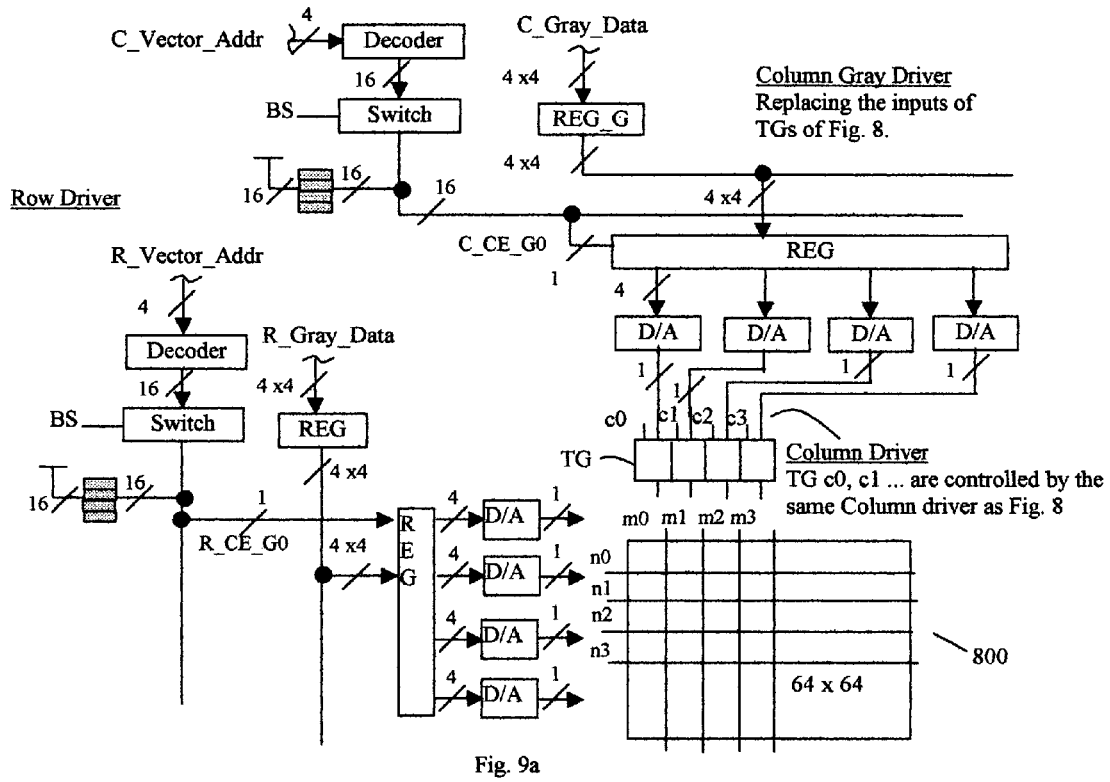
FIG. 9a-b uses a 64×64 passive OLED panel as an example to illustrate the Vector Driving circuitry with analog driving signals.

To output analog signals, the registers must store gray scale data and the panel electrodes must be driven by outputs of digital to analog converters (D/A). Assuming a gray scale of 16 levels (4 bits), then the same 64×64 panel of Example 1 needs 16 16-bit registers for columns. In the Column driver, because we still need Z outputs, the circuitry of FIG. 8 is preserved but the inputs of TGs are replaced by an additional set of circuitry (Column Gray Driver) that stores and provides gray scale data, as illustrated in FIG. 9*a*. Normally in 2D displays, gray scale signals provided only from columns will be enough. However, here in the "shot by shot" driving scheme, providing gray scale capability on the row drivers allows writing a column (or multiple columns) with gray scale distribution in one "shot". Therefore, 16 16-bit registers are also used for rows, as shown in FIG. 9*a*.

FIG. 9*b* shows a table of the effect of analog passive matrix signals. Because the rows are defined as anodes, the column addressing signals, except Z, can be made negative biased relative to GND to obtain forward biased voltages across the OLED cells when row signal is 0.

2.2 Active Matrix Display Panel as Active Screen

EXAMPLE 3

Driving Signals are Binary

Figure 10:
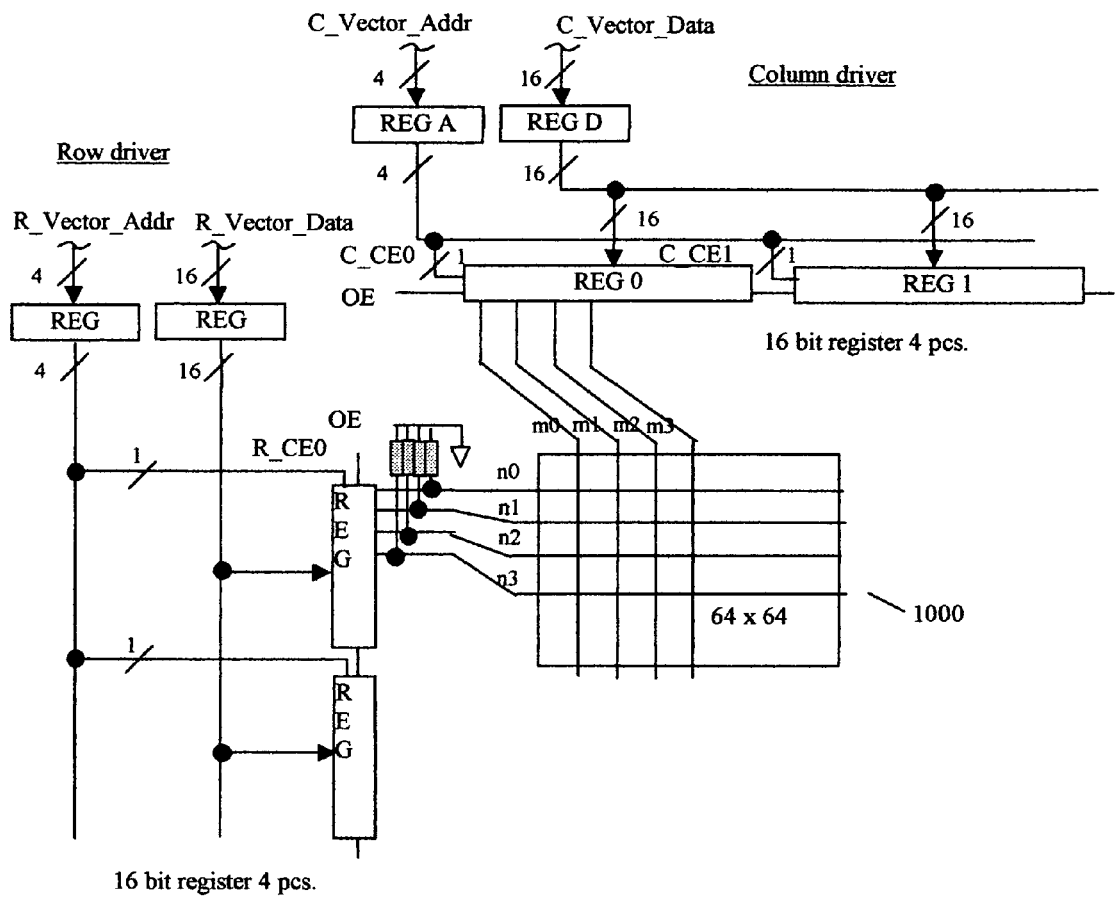
FIG. 10 uses an active matrix OLED panel as an example to illustrate the Vector Driving circuitry with binary driving signals.

FIG. 10 uses a 64×64 active matrix OLED panel 1000 as an example to illustrate the Vector Driving circuitry with binary driving signals. FIG. 10 assumes:

(1) Rows are gate lines. Columns are cathodes and have voltages negatively biased. Anode is ITO and is grounded.

(2) Column driver outputs are voltage outputs as example. They can also be current sinks and the column vectors can be the control voltages of the current sinks. General techniques for driving OLED (and LCD) with TFT (thin film transistor) AM (active matrix) cane be found in the paper by Lih "AMOLED Backplanes: Amorphous silicon vs. Polysilicon" in INFORMATION DISPLAY v. 20 n. 6 2004 p. 18, which is incorporated herein by reference.

A few key points:

(1) A global erase is needed before writing a new frame, because active matrix cells store previous pixel data.

(2) In each frame, a gate line should be turned on only once and then turned off, or else the previously stored pixel data could be contaminated when writing to other rows.

(3) Driving can be as fast as the TFT (thin film transistor) circuitry allows.

(4) Truth table for driving signals

| Row | Column | Pixel state |
|-----|--------|-------------|
| 0   | x      | 0           |
| 1   | 0      | 0           |
| 1   | (1)    | 1           |

(Row is TFT gate line)

Circuitry Operations in One Shot:

Vector writing column registers: The column driver basically has the same configuration as the column driver in FIG. 8, except that there are no transmission gates. (Pull-up resistors and bus switch are omitted in the figure for simplicity.) OE (output enable) is set to LO and puts register outputs in open state (Z) during vector writing. Column electrodes are therefore all open. (They can also be pulled up or down during register writing if preferred.)

Vector writing row registers: Row driver basically has the same configuration as the column driver. The writing procedure is also the same. All rows (gate lines) are pulled down and all TFT gates are off.

Enabling a "shot": Set OE HI to make one "shot".

EXAMPLE 4

Driving Signals are Analog

In this case, because the rows are gate lines, we can not have gray scale variation in the vertical direction within one driving "shot". So the row driver remains the same as FIG. 10. The column driver will have the form of row driver of FIG. 9*a* to provide gray scale in the horizontal direction, within one shot.

Figure 10A:
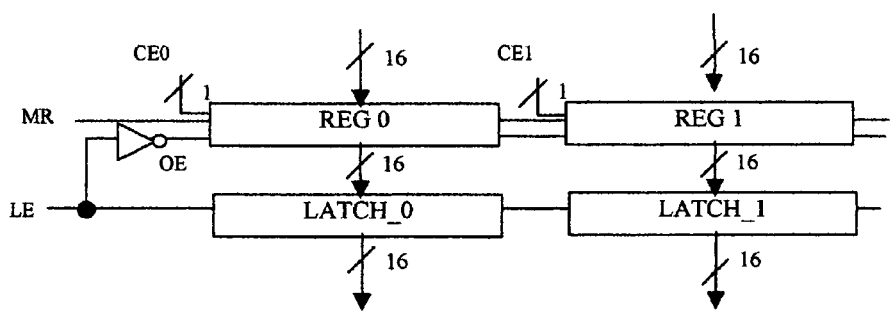
FIG. 10a illustrates the use of an additional layer of latches in the panel driver.

In all four examples described above, during writing to registers, the register outputs are made to Z state and electrode lines are made open. Alternatively, an additional layer of registers, or latches, can be inserted at the outputs of the original registers, as illustrated in FIG. 10*a*. Before writing starts, when the register outputs are disabled, the original outputs are latched so that the driving signals are kept during writing. In other word, the original registers become a memory buffer. This further increases the duration of display of each image "shot" in the passive matrix display systems.

3. Image Design and Processing

By the Vector Driving scheme of chapter 2, the image that can be displayed in one driving shot must be generated by one set of full-width column driving signals with one set of full-width row driving signals. The image is therefore a combination of a number of simple orthogonal patterns aligned in vertical or horizontal directions. Mainly, these are patterns of vertical line segments, horizontal line segments and blocks. Patterns aligned in the vertical direction must have the same width in the horizontal direction; and patterns aligned in the horizontal directions must have the same height in the vertical direction. FIG. 11 illustrates the idea. Image design and processing therefore need to Organize the image on one frame into a number of "shots".

Minimize the total number of shots per frame.

Game Image

In applications of V3D displays for gaming display, the gaming figures and background images can be designed to minimize the number of addressing shots. This is to limit the graphics to be combinations of orthogonal patterns and align them properly whenever possible. Even simple orthogonal patterns can form many composite shapes with low number of shots, especially when patterns are combined in V3D. FIG. 12a-c illustrates a few very simple examples. FIG. 12a shows example shapes that can be displayed in 2 to 3 shots. FIG. 12b shows a V3D stick figure in two views. It takes six frames, with each frame having one to two shots. FIG. 12c shows a V3D "Starship Enterprise" in three views. It takes four frames. Images on each frame can be displayed in one to three shots.

Non-game Image (Arbitrary Images)

For a curve on a frame, a pre-processing should try to simplify the curve, especially simplify those oblique segments. Oblique lines and edges will require more shots. The pre-processing should then allocate line segments into vertical and horizontal segments, which will then be turned into column vectors and row vectors. The conversion should be optimized to minimize the amount of shots required. FIG. 13a-b illustrates the idea. For an area on a frame, the pre-processing should try to fill the area with orthogonal patterns while trying to minimize the total number of patterns in the area. FIG. 13c illustrates the idea. The pre-processing will take computation time. But once the results are obtained, the vectors for the whole volumetric image can be stored in image memory buffer and then be displayed repeatedly.

4. Signal Coupling Systems

A system for coupling signals between the rotary reciprocating active screen and the stationary controller is needed. In the wireless coupling approach, the approach is to use a pair of wireless communication devices, one device placed at the signal I/O end of the stationary controller and the other at the I/O end of the circuitry on the moving display panel. In addition to flexure ribbon connection and wireless coupling, there are other preferred embodiments for coupling signals between the rotary reciprocating active screen and the stationary controller.

4.1 Multi-slot Optical (Including IR) Link

This system uses pairs of optical emitter (on the stationary controller) and receiver (on the active screen) to transmit control signals. The receiver is of the type of digital logic devices and has large working distance and field of view. Therefore, varying relative distance and position between the emitter and the receiver has no significant effect on the transmission fidelity, as long as the receiver sees only the light from the emitter. One example receiver is OPL551 photo logic device. FIG. 14a illustrates, in perspective view, a multi-channel link implemented by multiple slots 1403 with each slot housing one emitter (1401E) and receiver (1401R) pair. Slots are divided by light-shields 1405 attached to the bottom of the active screen assembly and are open only at bottom, where the stationary emitters 1401E sit on elevated posts 1402. The depth of the light shields and the height of the posts are matched such that the light shields block any light other than the corresponding emitter of the slot even when the screen moves to top position, as illustrated in FIG. 14b. FIG. 14c illustrates the active screen assembly moves to bottom position. FIGS. 14b and 14c are both in front-view, or sectional-view.

4.2 Two-stage Slip-ring Coupling

Another multi-channel coupling method is to use multiple slip rings in two-stage. FIG. 15a illustrates the idea in exploded view. In the rotary reciprocating mechanism, there are two places where two components of the mechanism rotate relative to each other. The first place is between the rotary arm and the support structure of the active screen 520. The second place is between the stationary side-walls 1501 and the rotary arms 510a. The coupling therefore requires two stages of slip-rings. Slip-ring set #1, 1510a, couples the first place. Slip-ring set #2, 1510b, couples the second place. Each slip-ring set comprises a set of concentric slip rings, such as 1511a, and a set of slip contacts that match the concentric rings, such as 1512a. FIG. 15b shows a cross-sectional view of the mechanism. The set #1 concentric rings 1511a are made on the surface of the rotary arm. The slip contacts 1512a are attached on the stationary side-wall 1501 so they ride over the rings as the rotary arm rotates. Similarly, the set #2, 1511b, are made on the support structure wall and the slip contacts 1512b are on the rotary arm. The set#2 slip contacts are also connected to the set #1 rings at 1513, to complete the 2-stage coupling.

Placing the concentric rings on the surface of the rotary arm or the side wall keeps the whole mechanical assembly compact. But the ring radius can be large if the channel number is high. Slip-rings can also be placed on shaft instead to keep the radius small and reduce slip-ring cost. But the two-stage coupling is still necessary, as illustrated in FIG. 16. The first set of slip rings 1511c are placed around the shaft of the rotary arm 511, which goes into the bearing 551 in the side wall 1501. The corresponding slip contacts 1512c are placed on the side wall. The second set of slip rings 1511d are placed around the shaft attached to one end of the rotary arm 512, which the support structure 520 rides on with bearing 552. The corresponding slip contacts 1512d are placed on the support structure 520.

The double-stage slip-ring concept can be broadened to include non-mechanical slip-rings. Magnetic or optical slip-rings can also be arranged as concentric rings in two stages in order to form multiple channel couplings.

4.3 Two-stage Fiber Coupling

The signal coupling can also be made by a single channel high-speed optical link, such as an optical fiber link, as illustrated in FIG. 17. Three sections of optical fiber, 1701a, 1701b and 1701c, are optically connected by two optical couplings 1710a and 1710b. Part of fiber section 1701b needs to be put inside the rotary arm shaft 511 so that it can become an integral part of the rotor, arm assembly. Similarly, part of section 1701c needs to be inside shaft 512 and the shaft has to become an integral part of the screen support structure 520. The bearing is therefore placed on the rotary arm 553.

Alternatively, a pair of emitter-receiver coupling with electric leads, instead of optical fibers, can replace each fiber coupling.

In general, optical coupling is limited to transmission of signals. Power connections for the moving electronics on the active screen still require mechanical slip-rings.

5. Multi-panel Tiling

Figure 18:
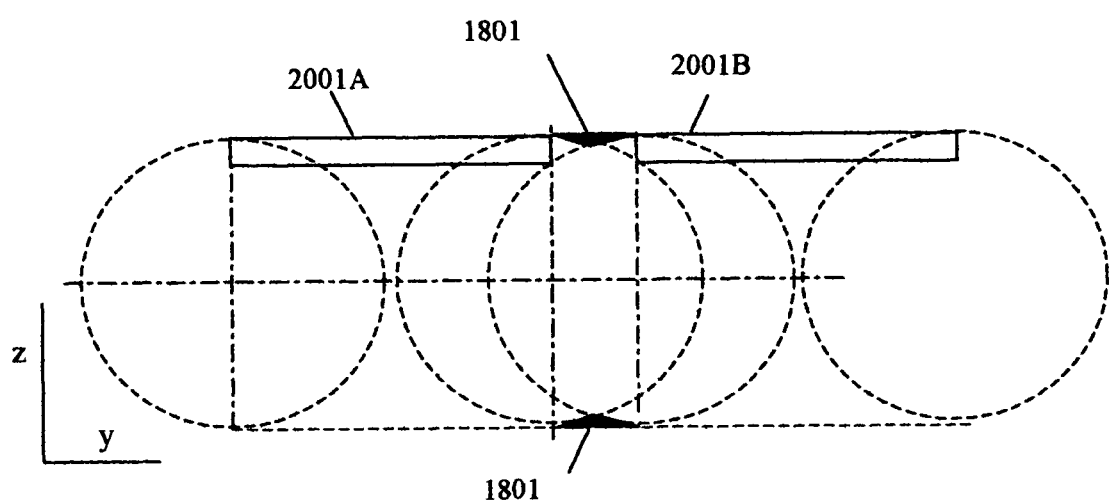
FIG. 18 illustrates an active screen with two display panels tiled together.

If necessary, multiple active panels can be tiled together to increase the active area of the active screen. Because of the need of edge connection for driving circuitry, gaps between panels may be unavoidable. However, if the gaps exist only in the direction of rotary motion (or y direction), then the effect of the gaps on the display volume is minimum. As illustrated in FIG. 18, the display dead zones 1801 caused by the gap area between the two display panels, 2001A and 2001B, are near top and bottom of the display volume and are very small.

6. Concluding Notes

The foregoing discussion should be understood as illustrative and should not be considered to be limiting in any sense.

Figure 3:
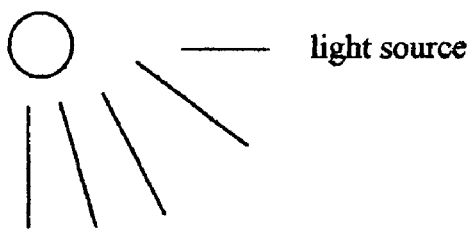
FIG. 3 illustrates a volumetric 3D display based on a panel of reflective LCD.
Figure 3:
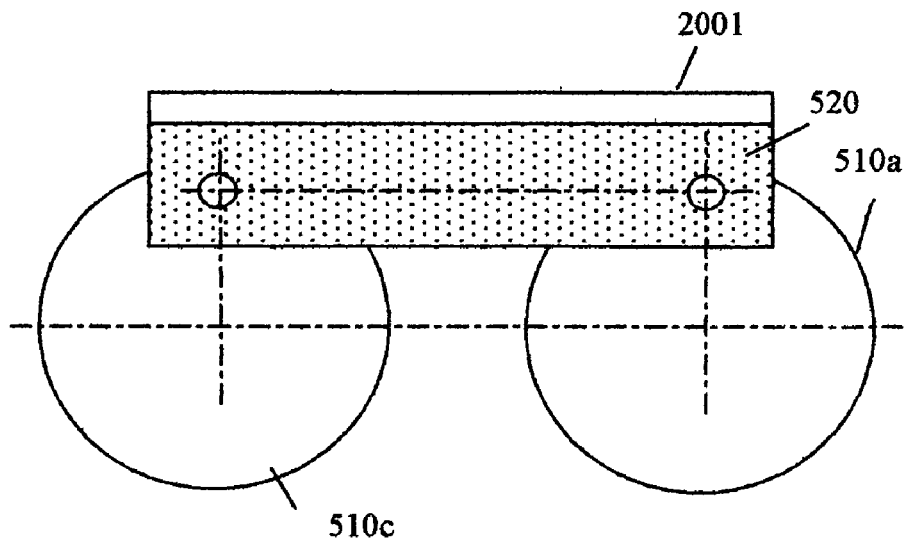
Figure 4:
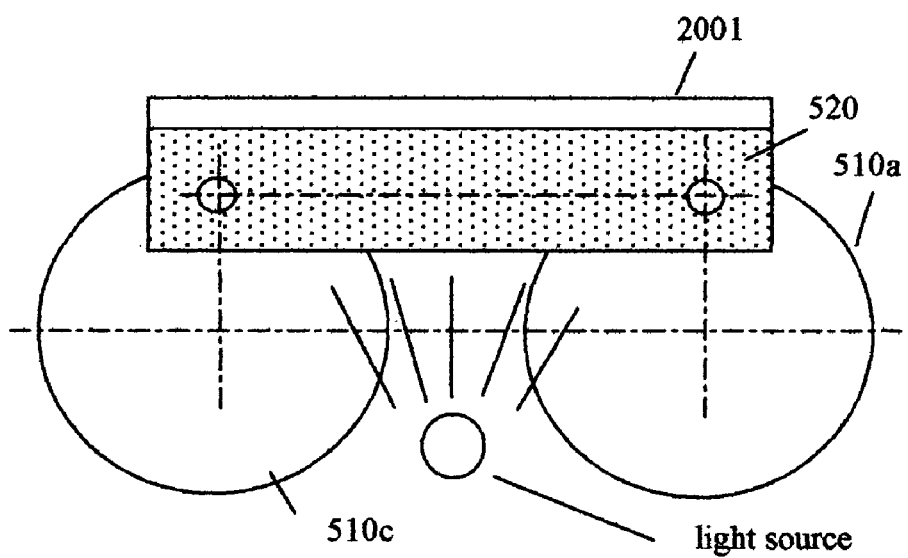
FIG. 4 illustrates a volumetric 3D display based on a panel of transmissive LCD.

For example, besides emissive display panels such as OLEDs, Active Screen can also apply a reflective display (mainly reflective type of LCD) or a transmissive display (e.g. a transmissive type LCD). FIG. 3 illustrates a volumetric 3D display based on a rotary reciprocating panel of reflective LCD, with a light source at top. FIG. 4 illustrates a volumetric 3D display based on a rotary reciprocating panel of transmissive LCD, with a light source at bottom.

For example, the Vector Driving method can be applied to other volumetric 3D display systems, indeed any other display systems, that use a column-row addressable display panel as image source.

For another example, the transmission gates used in FIG. 8 and FIG. 9a can be replaced by an array of transistors or micro-relays.

While this invention has been particularly shown and described with reference to certain embodiments thereof, it will be understood that these embodiments are shown by way of example only. Those skilled in the art will appreciate that various changes in form and details may be made therein without departing from the spirit and scope of the invention as defined by the following claims and their equivalents.

The invention claimed is:

1. Method of displaying a 3D image in actual space including the steps of:
   (1) providing a display panel that revolves about a reference axis while keeping its surface always facing a fixed direction, said display panel comprising a matrix of pixels that can be addressed from a set of column electrode lines and a set of row electrode lines, said display panel sweeping a display space;
   (2) defining an orthogonal 3D grid structure just covering said display space;
   (3) processing said 3D image into an orthogonal stack of image slices based on said orthogonal 3D grid structure, each said image slice having its surface normal direction facing said fixed direction;
   (4) converting said image slices into image frames to be displayed on said display panel based on following relation:

$$pmy = py - R/dN - (R/dN)\sin\theta,$$

$$\theta = \cos^{-1}(1 - pz\, dT/R),$$

wherein pmy is grid element location index in y direction on said image slices, py is pixel location index in y direction on said image frames, said y direction is perpendicular to said reference axis and to said fixed direction, both location indices have origins on the same side of the slice or frame, R is rotation radius of said display panel, dT is distance between adjacent image frames, dN is pixel pitch of said display panel, pz is frame index number starting at 0 from top position, θ is angle of rotation of said display panel measured from top position of said display panel;
   (5) displaying said image frames on said display panel in sequence.

2. Method of claim 1, further including the step of converting each said image frame into a number of image shots, each of said image shot comprising a number of simple orthogonal patterns aligned in vertical or horizontal directions, combination of said image shots approximating the corresponding image frame, the step of displaying image frames including the step of displaying said image shots on said display panel in sequence.

3. Method of claim 2, wherein each said image shot corresponding to a set of column signal vectors and a set of row signal vectors, each said signal vector comprising a number of signal bits for a corresponding group of adjacent electrode lines, the step of displaying each said image shot including the step of writing only non-blank signal vectors to said display panel.

4. Method of claim 2, wherein the step of displaying each image shot including the step of providing driving signals to all of said column electrode lines and to all of said row electrode lines simultaneously.

5. Method of claim 1, further including the step of signal coupling between said display panel and a stationary controller by one of the following signal coupling methods:
   (1) wireless transmission;
   (2) multiple slot optical link;
   (3) a 2-stage slip-ring system;
   (4) a 2-stage optical fiber link.

6. Method of claim 1, further including the step of providing at least one more display panel tiled with the original display panel to increase the size of display space.

7. System for displaying a 3D image in actual space comprising:
   a display panel moving in rotary reciprocating motion and sweeping a display space, by said rotary reciprocating motion said display panel revolving about a reference axis while keeping its surface always facing a fixed direction, said display panel being mounted on a support structure and a set of rotary arms driving said support structure;
   wherein the improvement comprises:
   an improved signal coupling system for signal communication between a stationary control unit and said display panel in rotary reciprocating motion, said signal coupling system comprising one of the following systems: (1) a multiple slot optical link system, (2) a 2-stage slip-ring system, or (3) a 2-stage optical fiber link system;
   said multiple slot optical link system comprising a set of multiple pairs of optical emitter and receiver, said receiver comprising a type of digital logic receiver with large working distance and large field of view, the pairs of emitter and receiver being placed within a set of multiple slots with each one slot housing one pair of emitter and receiver, each of said slots being divided by a light shield so that only the corresponding emitter and receiver forms an optical ink, said emitters and receivers being physically connected to said stationary control unit and said display panel respectively, thereby said emitters and said receivers maintaining transmission fidelity even when the distance and relative positions between said emitters and said receivers vary during said rotary reciprocating motion of said display panel;
   said 2-stage slip-ring system comprising a first slip-ring set and a second slip-ring set, said first slip-ring set forming electric coupling between said stationary control unit and said rotary arms, said second slip-ring set forming electric coupling between said rotary arms and said display panel, each said slip-ring set comprising a number of slip contacts and corresponding rings, said rings comprising concentric rings attached to the surface of said rotary arms, or to the shafts of said rotary arms, or to said support structure, or to stationary side walls, the rings or contacts of the first slip-ring set and the rings or contacts of the second slip-ring set having corresponding electric connections in said rotary arms;
   said 2-stage optical fiber link system comprising three sections of optical fiber and two optical couplings, the first section of optical fiber having one end connected to said stationary control unit and the other end coupled to one end of the second section of optical fiber by the first optical coupling along the axis of the shaft of one of said rotary arms, the other end of the second section of optical fiber being coupled to the third section of optical fiber by the second optical coupling, the second optical coupling being along the axis of one of a number of shafts connecting said support structure and the corresponding rotary arm, the second section of optical fiber being mounted in this corresponding rotary arm, the third section of optical fiber connecting to said display panel.

8. Method of displaying 3D gaming figures and background images in an active screen volumetric 3D display for gaming applications, said active screen volumetric 3D display comprising a moving display panel that sweeps a display space repeatedly, said display panel comprising a matrix of pixels that can be addressed from a set of column electrode lines and a set of row electrode lines, said display panel displaying frames of image in sequence when said display panel moves across said display space, said frames of image thereby forming volumetric 3D images in actual space;

wherein the improvement comprises a procedure of designing and displaying said 3D gaming figures and background images, said procedure being capable of reducing the time required to address the matrix of electrode lines of the said display panel in order to display a frame and thereby meeting a frame rate required to form volumetric 3D images;

said procedure forming a 3D gaming figure or a background image by combining a plurality of orthogonal patterns into composite shapes in volumetric 3D space, said orthogonal patterns being displayed on a limited number of said frames of image, on each frame said orthogonal patterns comprising horizontal or vertical line segments or rectangular areas;

said procedure further organizing said orthogonal patterns on each frame into a limited number of image shots, each said image shot comprising patterns aligned in vertical direction and having the same width in the horizontal direction or aligned in horizontal direction and having the same height in the vertical direction, such that one image shot can be displayed by simultaneously applying one set of column driving signals to all of said column electrode lines and one set of row driving signals to all of said row electrode lines, and one frame can be displayed by displaying a limited number of image shots in sequence, thereby keeping total addressing time short.

9. Method of claim 8, wherein said display panel revolving about a reference axis while keeping its surface always facing a fixed direction;

said method further including the step of defining an orthogonal 3D grid structure just covering said display space;

said 3D gaming figures and background images including an orthogonal stack of image slices based on said orthogonal 3D grid structure, each said image slice having its surface normal direction facing said fixed direction;

said method further including the step of converting said image slices into frames to be displayed on said display panel based on following relation:

$$pmy = py - R/dN - (R/dN)\sin\theta,$$

$$\theta = \cos^{-1}(1 - pz\, dT/R),$$

wherein pmy is grid element location index in y direction on said image slices, py is pixel location index in y direction on said image frames, said y direction is perpendicular to said reference axis and to said fixed direction, both location indices have origins on the same side of the slice or frame, R is rotation radius of said display panel, dT is distance between adjacent image frames, dN is pixel pitch of said display panel, pz is frame index number starting at 0 from top position, θ is angle of rotation of said display panel measured from top position of said display panel.

* * * * *